United States Patent [19]
Miner

[11] 3,747,430
[45] July 24, 1973

[54] VERTICALLY AND LATERALLY SHIFTABLE HANDLE

[75] Inventor: Earl L. Miner, Moran, Kans.

[73] Assignee: Lawlor Industries, Inc., Addison, Ill.

[22] Filed: Apr. 21, 1972

[21] Appl. No.: 246,375

[52] U.S. Cl. ................................................ 74/523
[51] Int. Cl. ............................................. G05g 1/04
[58] Field of Search .................... 74/523, 525, 527, 74/551.1, 510; 16/111 A, 111 T, 111 C, 111 B; 56/253, DIG. 18

[56] References Cited
UNITED STATES PATENTS
1,389,249  8/1921  Kitchel ........................ 56/DIG. 18

Primary Examiner—Milton Kaufman
Assistant Examiner—Frank H. McKenzie, Jr.
Attorney—Jack E. Dominik, Robert E. Knechtel et al.

[57] ABSTRACT

A vertically and laterally shiftable handle for wheeled vehicles which can be vertically shifted, laterally shifted or shifted both vertically and laterally simultaneously.

9 Claims, 5 Drawing Figures

PATENTED JUL 24 1973

VERTICALLY AND LATERALLY SHIFTABLE HANDLE

This invention relates to an improved vertically and laterally shiftable handle for a wheeled vehicle.

There are many wheeled vehicles such as floor scrubbers, floor polishers, and lawn mowers and the like, having handles on them for steering the wheeled vehicle. In most cases, these handles are secured in a fixed position against lateral movement, even though they may be pivotally vertically raised or lowered. Even in the latter case, no provision is generally provided for locking the handle in one or more different vertically adjusted positions.

With some of these wheeled vehicles, particularly in the case of a floor scrubber and a lawn mower, for example, it is often desirable to maneuver the vehicle along side of a wall or a fence. In doing so, it is generally found that the fixed handles make it extremely difficult to traverse the length of the wall or fence, in view of book shelves or the like mounted on the wall, or the erratic operation of a lawn mower in trying to follow a straight path. These fixed handles can mar the walls or otherwise damage them as well as the book shelves or objects on the shelves or, in the case of a lawn mower, can become wedged in the fence making it that much more difficult to control the operation of the lawn mower.

Accordingly, it is an object of the present invention to provide an improved vertically and laterally shiftable handle for wheeled vehicles such as floor scrubbers, floor polishers, lawn mowers and the like.

A still further object is to provide a vertically and laterally shiftable handle for wheeled vehicles which can be vertically shifted, laterally shifted or shifted both vertically and laterally simultaneously.

Still another object is to provide a vertically and laterally shiftable handle for wheeled vehicles of the above-described type which are relatively simple both in construction and operation.

Still another object is to provide a vertically and laterally shiftable handle for wheeled vehicles which can be locked in an adjusted position which permits the wheeled vehicle to be transported down, for example, a flight of stairs.

A still further object is to provide a vertically and laterally shiftable handle for wheeled vehicles which, in the case of a floor scrubber having a squeegee bar, is coupled to the squeegee bar to raise and lower it in accordance with the position of the handle.

Other objects of the invention will in part be obvious and will in part appear hereinafter.

For a fuller understanding of the nature and objects of the invention, reference should be had to the following detailed description taken in connection with the accompanying drawings in which.

Similar reference characters refer to similar parts throughout the several views of the drawings.

Figure 1:
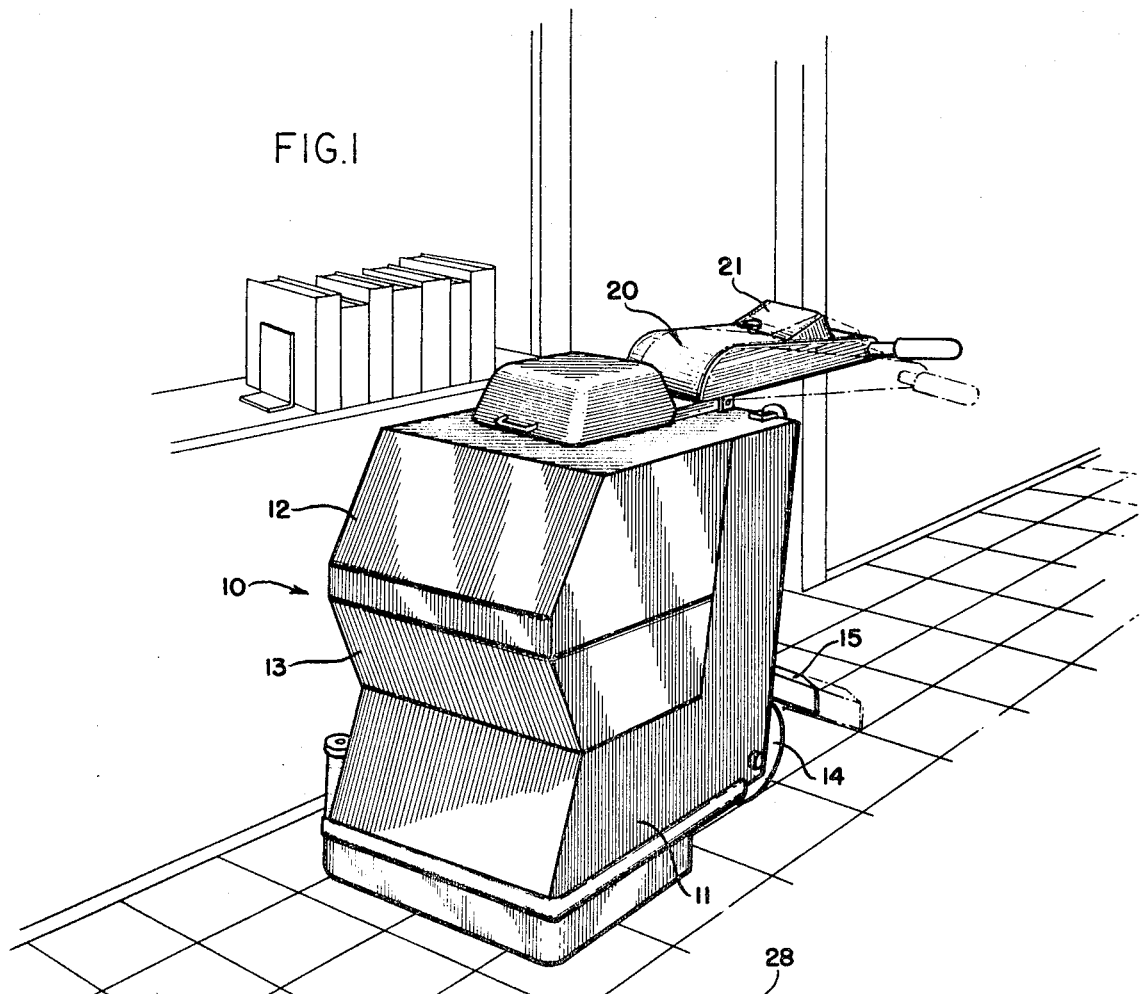
FIG. 1 is a perspective view of a floor scrubber having a vertically and laterally shiftable handle exemplary of the present invention provided on it.

Referring now to the drawings, in FIG. 1 there is illustrated a floor scrubber 10 having a generally L-shaped housing 11 to which is affixed a vertically and laterally shiftable handle 20 exemplary of the present invention. The floor scrubber 10 generally includes a dirty water tank 12 and a clean water tank 13 nested and disposed within the crotch formed by the legs of the L-shaped housing 11. A pair of wheels 14 (only one of which is shown) are affixed to an axle 17 which is supported by a support frame (not shown) generally concealed by the L-shaped housing of the floor scrubber 10. A scrubber brush 16 (FIGS. 4 and 5) likewise is affixed to the support frame of the floor scrubber 10. Also, a squeegee bar 15 is affixed to a pair of arms 47 which are secured to the axle 17 in a fashion such that the squeegee bar 15 can move laterally against a bias spring (not shown) on the axle, as a wheel 51 (FIG. 5) on one end thereof engages a surface such as a wall.

Figure 2:
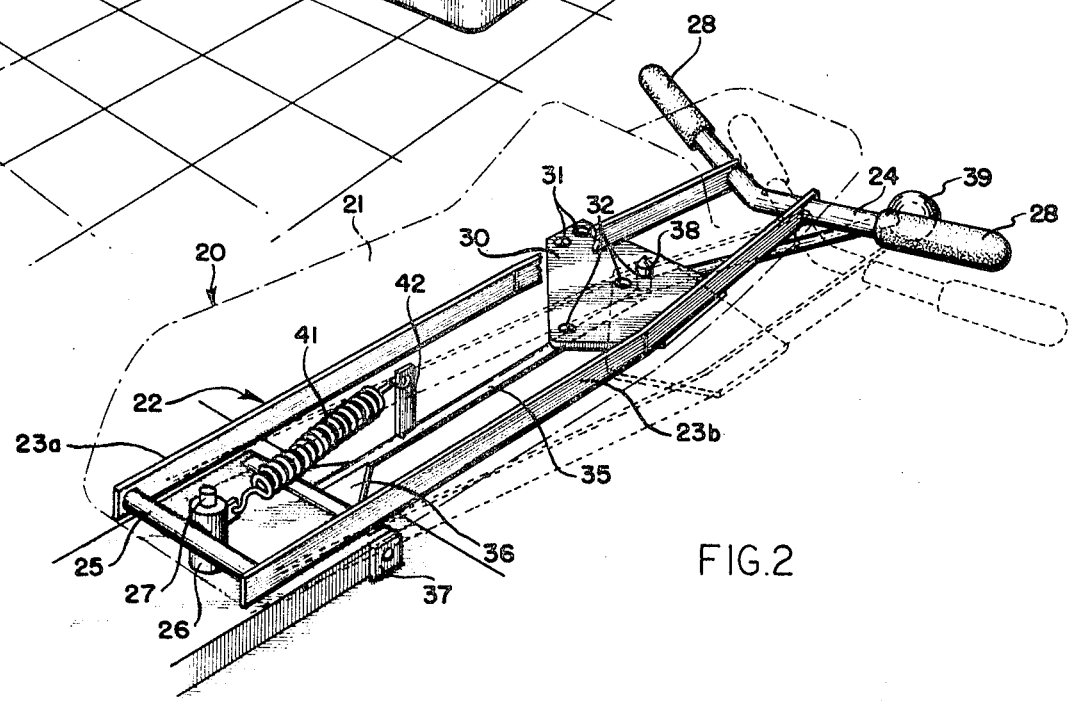
FIG. 2 is a perspective view of the handle, with its housing removed, to generally illustrate its construction and operation.

The vertically and laterally shiftable handle 20 can be best seen in FIG. 2, and includes a generally T-shaped member 22 having a stem portion 23 formed by a pair of arms 23a and 23b and a cross member 24 generally in the form of a rod forming laterally extending hand grips which may have rubber grips 28 thereon. The ends of the arms 23a and 23b forming the stem portion 23 of the T-shaped member 22 are fixedly secured together by means of a shaft (not shown) contained within a tubular connector bar 25 in a fashion such that the T-shaped member 22 can be pivotally vertically raised and lowered. The tubular connector bar 25 is fixedly secured to a pivot bushing 26 which is rotatably secured on a pivot shaft 27 affixed to the L-shaped housing 11 of the vehicle. The pivot bushing 26 is rotatable on the pivot shaft 27 so that the T-shaped member 22 can be pivoted laterally back and forth.

An adjustment plate 30 is fixedly secured to the arms 23a and 23b forming the stem portion 23 of the T-shaped member. This adjustment plate 30 has a number (two as illustrated) of lateral position locking means and vertical position locking means on it which, in the illustrated example, are in the form of apertures 31 and 32, respectively. These lateral position locking means or apertures 31 and the vertical position locking means or apertures 32 permit the T-shaped member 22 of the handle to be pivotally vertically adjusted or pivotally laterally adjusted, or both vertically and laterally pivotally adjusted, as described more fully below.

A handle positioning adjustment lever 35 in the form of an elongated rod has a ball grip 39 on its one end, while its opposite end has a cross member 36 affixed to it which is rotatably supported between a pair of brackets 37 (only one of which is shown) secured to the L-shaped housing 11 of the floor scrubber 10, so that the handle positioning adjustment lever 35 can only be pivotally vertically adjusted. Affixed to the handle positioning adjustment lever 35 is a locking means in the form of a rod-like shaft 38 which is correspondingly positioned and sized to seat within the respective ones of the lateral and vertical position apertures 31 and 32 on the adjustment plate. The locking means or rod-like shaft 38 on the handle positioning adjustment lever 35 is biased into locking engagement with the lateral and vertical position adjusting apertures 31 and 32, by means of a biasing spring 41 having one end thereof affixed to a bracket 42 secured to the handle positioning adjustment lever 35, and the opposite end thereof affixed to the pivot bushing 26.

The manner in which the handle 20 is laterally shifted is generally illustrated in FIG. 2, and the manner in which the lateral shift is accomplished is generally as follows. The handle positioning adjustment lever 35 is urged downwardly against the action of the biasing spring 41, to disengage the rod-like shaft 38 from the lateral or vertical position aperture 31 or 32 in which it is at the time lockingly engaged. After doing so, the T-shaped member 22 of the handle 20 is laterally shifted by pivoting it about the pivot shaft 27 to the desired position in such a way that the rod-like shaft 38 can be again extended through one or the other of the lateral position apertures 31 in the adjustment plate 30, as generally illustrated in phantom lines in FIG. 2. The handle 20 now is pivotally laterally shifted to the left of the longitudinal axis of the floor scrubber 10 as can be best seen in FIG. 5, where the handle 20 is shown in dotted lines in its original position and is shown in phantom in its laterally shifted position. In this position, it can be seen that the floor scrubber 10 can be maneuvered along the length of a wall, without the handle inadvertently striking a wall, a book shelf or the objects on it, or the like.

In the illustrated embodiment, the adjustment plate 30 is shown having only lateral position apertures 31 in it so that the handle 20 can be pivotally laterally shifted to the left of the longitudinal axis of the floor scrubber 10. It will be appreciated, however, that additional lateral position apertures 31 can be provided so that the handle 20 can be pivotally laterally shifted to the right. Furthermore, if desired, additional lateral position apertures 31 can be provided so that the handle 20 can be pivotally laterally shifted in different degrees, to the left or to the right.

To pivotally vertically adjust the position of the handle 20, the handle positioning adjustment lever 35 again is urged downwardly against the action of the biasing spring 41, to disengage the rod like shaft from the lateral or vertical position aperture 31 or 32 in which it is at the time lockingly engaged. After doing so, the T-shaped member 22 of the handle 20 is vertically shifted by pivoting it about the cross member 36 rotatably secured within the brackets 37, to the desired position. The rod-like shaft 38 is extended through one or the other of the vertical position apertures 32 in the adjustment plate 30, as generally illustrated in phantom lines in FIG. 3, to lock the handle 20 in its vertically adjusted position.

Again, in the illustrated embodiment, the adjustment plate 30 is shown to have three spaced apart vertical position apertures 32 provided in it. Also, the position of the lateral position apertures 31 coincide with the position of two of the vertical position apertures 32 such that, with this arrangement, the handle 20 must be simultaneously shifted laterally and vertically, to lock it in a laterally shifted position. Obviously, however, the lateral position apertures 31 also can be provided in the adjustment plate 30, so that the handle 20 can be pivotally laterally shifted without vertically adjusting its position.

Figure 5:
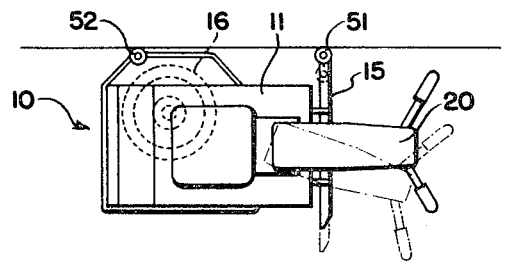
FIG. 5 is a top plan view of the floor scrubber, generally illustrating the manner in which the handle can be laterally shifted.

In the case of the floor scrubber 10, the handle 20 is coupled to the squeegee bar 15, by means of a connector rod or cable 48. Also, the lateral and vertical position apertures 31 and 32 in the adjustment plate 30 are provided and positioned in a fashion such as to provide three working positions for the squeegee bar 15. As can be best seen in FIG. 3, when the rod-like shaft 38 on the handle positioning adjustment lever 35 is engaged within the vertical position aperture 32, or the lateral position aperture 31, nearest the cross member 24 of the T-shaped member 22 of the handle, the squeegee bar 15 is positioned in a working relationship on the surface being scrubbed. Accordingly, the squeegee bar 15 can be placed in this working relationship when the handle 20 is laterally shifted, as illustrated in FIG. 5.

When the rod-like shaft 38 is engaged within the other one of the lateral position apertures 31, or the center one of the vertical position apertures 32, the squeegee bar 15 is pivotally vertically raised to a so-called "scrub position." That is, in this position, a surface can be scrubbed with the floor scrubber 10, without the action of the squeegee bar 15 collecting the dirty scrub water.

Figure 3:
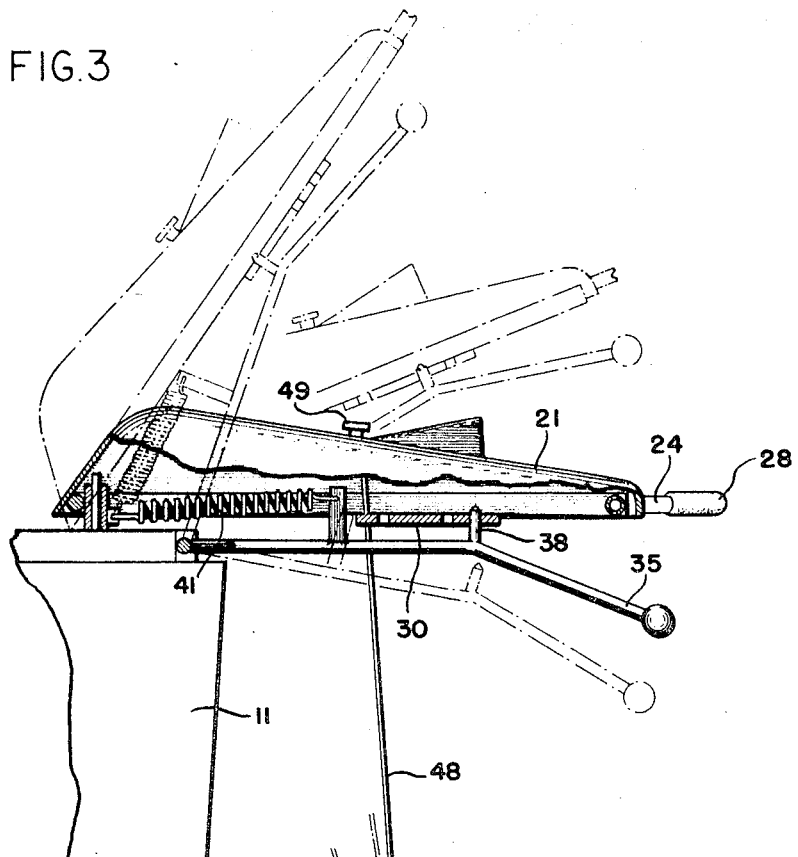
FIG. 3 is a partial side plan view of the floor scrubber of FIG. 1, generally illustrating the manner in which the handle can be vertically adjustably positioned, and further illustrating the manner in which the squeegee bar of the floor scrubber is raised and lowered by the handle.
Figure 4:
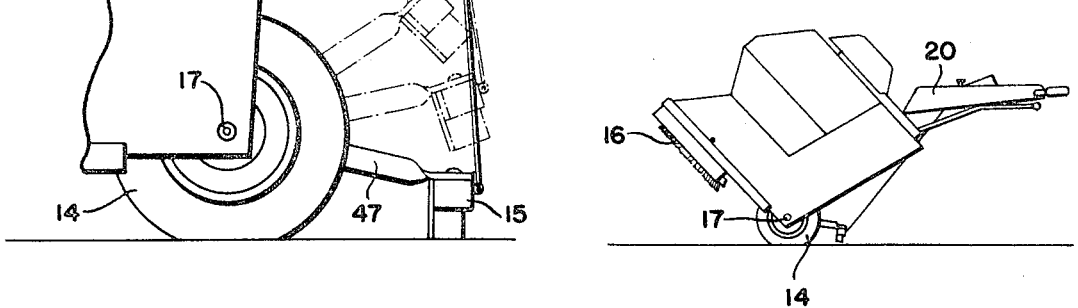
FIG. 4 is a side plan view generally illustrating the manner in which the handle can be locked in a position to permit the floor scrubber to be transported, for example, down a flight of stairs.

With the rod-like shaft 38 on the handle positioning adjustment lever 35 engaged within the remaining one of the vertical position apertures 32, the handle 20 is positionally locked in its uppermost pivotally vertically adjusted position illustrated in FIG. 3, and this raised position of the handle 20 is primarily provided to permit the floor scrubber 10 to be pivoted rearwardly, generally as illustrated in FIG. 4, to a position which enables an operator to transport the floor scrubber 10, for example, down a flight of stairs. In this position, it may be noted that the squeegee bar 15 also is pivotally vertically raised to a position where it is less likely to engage the surface of the floor, when the floor scrubber 10 is tilted, as illustrated.

The connector 48 is extended through the housing 21 on the handle 20, and has a connector adjustor in the form of a threaded knob affixed to its end, for adjustably positioning the squeegee bar 15. With the handle 20 in its lowermost position, the pressure engagement of the squeegee bar 15 on the floor surface can be adjusted, by threadedly manipulating the connector adjustor 49, to vertically raise or lower it and hence the squeegee bar 15 affixed to it.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A vertically and laterally shiftable handle for a wheeled vehicle such as a floor scrubber, a floor polisher, a lawn mower and the like, comprising a generally T-shaped member having the end of the stem portion thereof adapted to be pivotally and rotatably secured to a pivot member on a vehicle, the crossmember thereof forming laterally extending handle grips; a handle positioning adjustment lever having locking means thereon adapted to be fixedly secured to said vehicle and pivotal vertically with respect thereto; an adjustment plate affixed to said T-shaped member and having thereon a plurality of vertical position locking means and a plurality of lateral position locking means engageable by said first mentioned locking means on said handle positioning adjustment lever to lock said handle in different vertical positions and in different laterally shifted positions, respectively; said handle being vertically and laterally shiftable by disengaging said first mentioned locking means on said handle positioning adjustment lever with said vertical and lateral position locking means and vertically raising and laterally rotating said T-shaped member to permit said locking means to lockingly engage with the one of said vertical and lateral position locking means corresponding to the desired adjusted position for said handle.

2. The vertically and laterally shiftable handle of claim 1, further including biasing means for biasing said handle positioning adjustment lever to lockingly engage said locking means thereon with said vertical and lateral position locking means on said adjustment plate.

3. The vertically and laterally shiftable handle of claim 1, wherein said handle can be vertically adjusted to a plurality of different vertical positions by lockingly engaging said locking means on said handle positioning adjustment lever with an appropriate one of said vertical position locking means independently of any lateral shift in the position of said handle.

4. The vertically and laterally shiftable handle of claim 1, wherein said handle can be laterally shifted to different lateral positions by lockingly engaging said locking means on said handle positioning adjustment lever with an appropriate one of said lateral position locking means independently of any vertical shift in the position of said handle.

5. The vertical and laterally shiftable handle of claim 1, wherein said lateral position locking means are positioned on said adjustment plate such that said handle must be simultaneously vertically adjusted to engage said locking means on said handle positioning adjustment lever with said lateral position locking means, said lateral position locking means thereby functioning to adjustably lock said handle in both a lateral and vertical adjusted position.

6. The laterally and vertically shiftable handle of claim 1, wherein said lateral and vertical position locking means on said adjustment plate comprise a plurality of apertures in said adjustment plate, said locking means on said handle positioning adjustment lever comprising a rod-like shaft proportioned to seatingly engage within respective ones of said apertures.

7. The laterally and vertically shiftable handle of claim 6, wherein said handle positioning adjustment lever is pivoted vertically downwardly to disengage said rod-like shaft from an aperture, said handle being pivotally vertically raised or lowered or laterally shifted to a desired adjusted position with respect to said handle positioning adjustment lever and the latter then vertically pivotally raised to lockingly engage said rod-like shaft in the one of said apertures correspondingly positioned to lock said handle in the desired position.

8. The laterally and vertically shiftable handle of claim 1, further including connector means affixed to said handle and to another element of said vehicle for raising and lowering said other element depending upon the vertically adjusted position of said handle.

9. The laterally and vertically shiftable handle of claim 1, further including a housing substantially covering said T-shaped member and said handle positioning adjustment lever.

* * * * *